United States Patent
Taniguchi (10) Patent No.: US 11,731,473 B2
(45) Date of Patent: Aug. 22, 2023

(54) SUSPENSION DEVICE AND TRAVELING DEVICE

(71) Applicant: SUMITOMO HEAVY INDUSTRIES, LTD., Tokyo (JP)

(72) Inventor: Sigeru Taniguchi, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/967,901

(22) Filed: Oct. 18, 2022

(65) Prior Publication Data
US 2023/0122451 A1  Apr. 20, 2023

(30) Foreign Application Priority Data

Oct. 18, 2021 (JP) .................................. 2021-170365

(51) Int. Cl.
*B60G 7/00* (2006.01)
*B60G 3/14* (2006.01)
*B62D 61/10* (2006.01)

(52) U.S. Cl.
CPC .............. *B60G 3/14* (2013.01); *B60G 7/001* (2013.01); *B62D 61/10* (2013.01); *B60G 2200/13* (2013.01)

(58) Field of Classification Search
CPC ...... B60G 3/14; B60G 7/001; B60G 2200/13; B62D 61/10; B62D 61/12
See application file for complete search history.

(56) References Cited

U.S. PATENT DOCUMENTS

2003/0159863 A1*  8/2003  Hurlburt ............... B60G 9/02
                                                                    180/24.12
2009/0172915 A1   7/2009  Hunziker

FOREIGN PATENT DOCUMENTS

| CN | 113086051 A | 7/2021 |
| GB | 2441318 A | 3/2008 |
| JP | 2020019348 A | 2/2020 |
| WO | 03034969 A1 | 5/2003 |
| WO | 2006102781 | 10/2006 |

* cited by examiner

*Primary Examiner* — James M Dolak
*Assistant Examiner* — Matthew James O'Neill
(74) *Attorney, Agent, or Firm* — HEA Law PLLC (57) ABSTRACT

Provided is a suspension device including a drive wheel, a first driven wheel that is disposed on one side in a front-rear direction with respect to the drive wheel, a second driven wheel that is disposed on the other side in the front-rear direction with respect to the drive wheel, a bogie link member that supports the drive wheel and the first driven wheel and is oscillatable around a first oscillation axis, and a rocker link member that supports the second driven wheel and the bogie link member and is oscillatable around a second oscillation axis. When viewed from a left-right direction, the first oscillation axis is not on the same vertical line as a rotation axis of the drive wheel and is located above the rotation axis in a vertical direction and located inside a contour of the drive wheel.

8 Claims, 8 Drawing Sheets

SUSPENSION DEVICE AND TRAVELING DEVICE

RELATED APPLICATIONS

The content of Japanese Patent Application No. 2021-170365, on the basis of which priority benefits are claimed in an accompanying application data sheet, is in its entirety incorporated herein by reference.

BACKGROUND

Technical Field

Certain embodiments relate to a suspension device used for a traveling device.

Description of Related Art

The related art discloses a suspension device using a rocker bogie mechanism including a bogie link member that supports a drive wheel and a first driven wheel, and a rocker link member that supports a second driven wheel and a bogie link member.

SUMMARY

According to an embodiment of the present invention, there is provided a suspension device of the present disclosure including a drive wheel; a first driven wheel that is disposed on one side in a front-rear direction with respect to the drive wheel; a second driven wheel that is disposed on the other side in the front-rear direction with respect to the drive wheel; a bogie link member that supports the drive wheel and the first driven wheel and is oscillatable around a first oscillation axis; and a rocker link member that supports the second driven wheel and the bogie link member and is oscillatable around a second oscillation axis. When viewed from a left-right direction, the first oscillation axis is not on the same vertical line as a rotation axis of the drive wheel and is located above the rotation axis in a vertical direction and located inside a contour of the drive wheel.

DETAILED DESCRIPTION

The inventor of the present application has recognized that there is room for improvement in the related art in order to reduce the size of the suspension device using the rocker bogie mechanism.

According to the present disclosure, it is desirable to provide a technique for reducing the size of a suspension device using a rocker bogie mechanism.

Embodiments will be described below. The same reference numerals will be given to the same components, and overlapping descriptions will be omitted. In the respective drawings, for convenience of explanation, components are appropriately omitted, enlarged, or reduced. The drawings should be viewed in accordance with the orientation of the reference numerals.

One Embodiment

Figure 1:
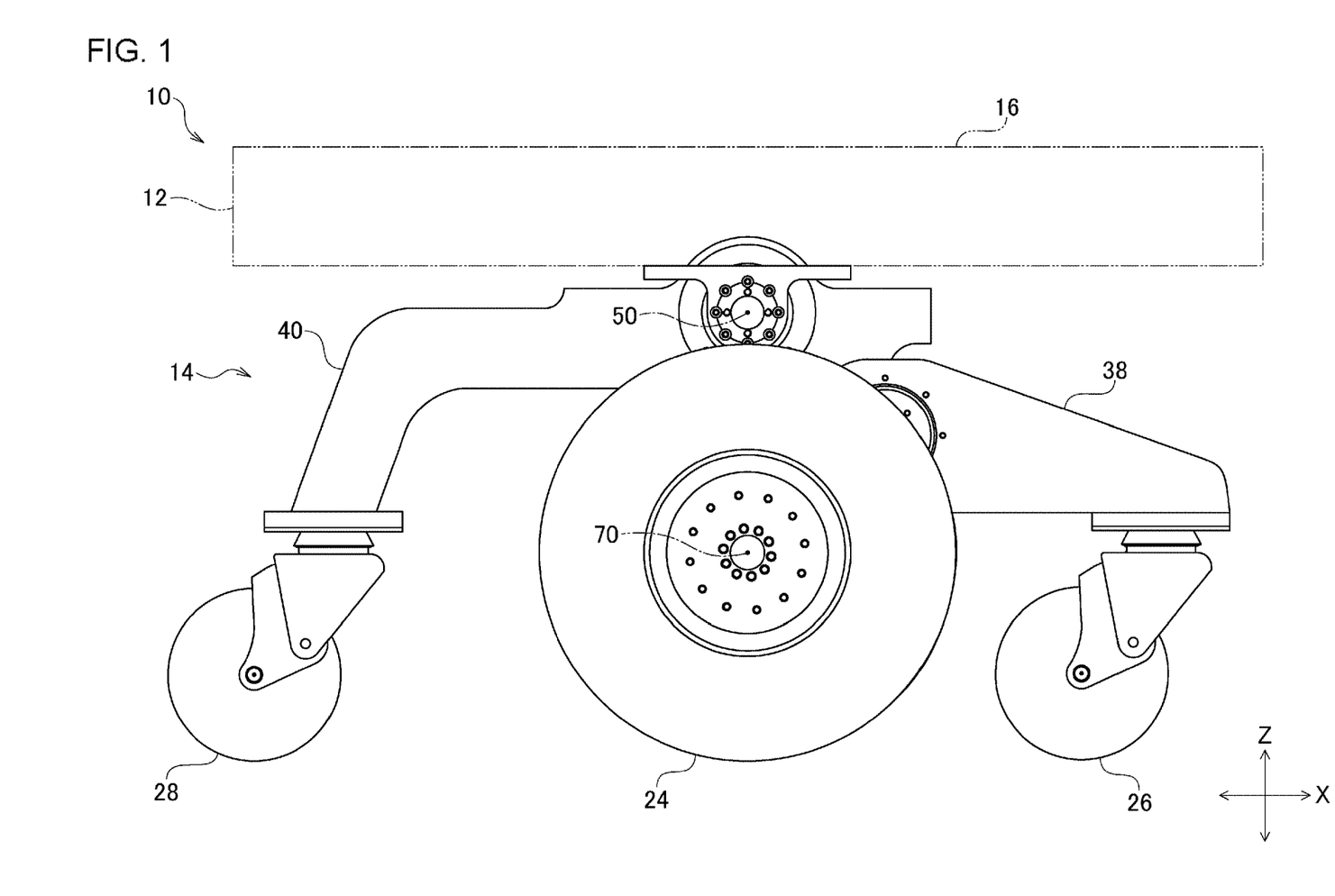
FIG. 1 is a side view of a traveling device according to one embodiment.

FIG. 1 will be referred to. A traveling device 10 is an automatic guided vehicle such as an automatic guided vehicle (AGV) or an autonomous mobile robot (AMR). The traveling device 10 includes a device body 12 and a suspension device 14 attached to the device body 12. The device body 12 includes a placement portion 16 for placing an article to be transported. The device body 12 is equipped with a control device (not shown) composed of a computer for controlling the traveling operation of the traveling device 10, a battery (not shown) that supplies power to the control device and a driving device 20 (to be described below), and the like.

Figure 2:
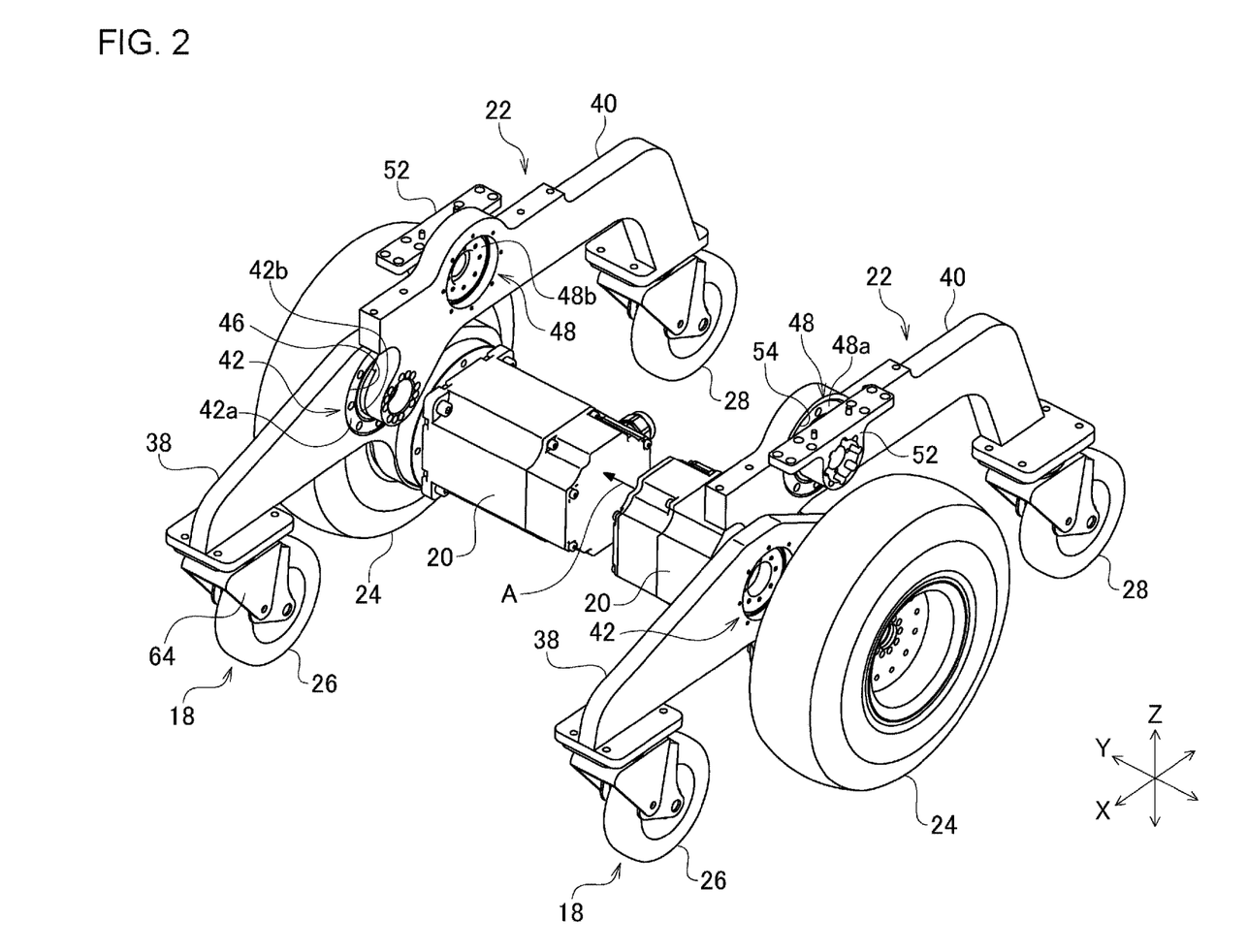
FIG. 2 is a perspective view of a suspension device of the one embodiment.
Figure 3:
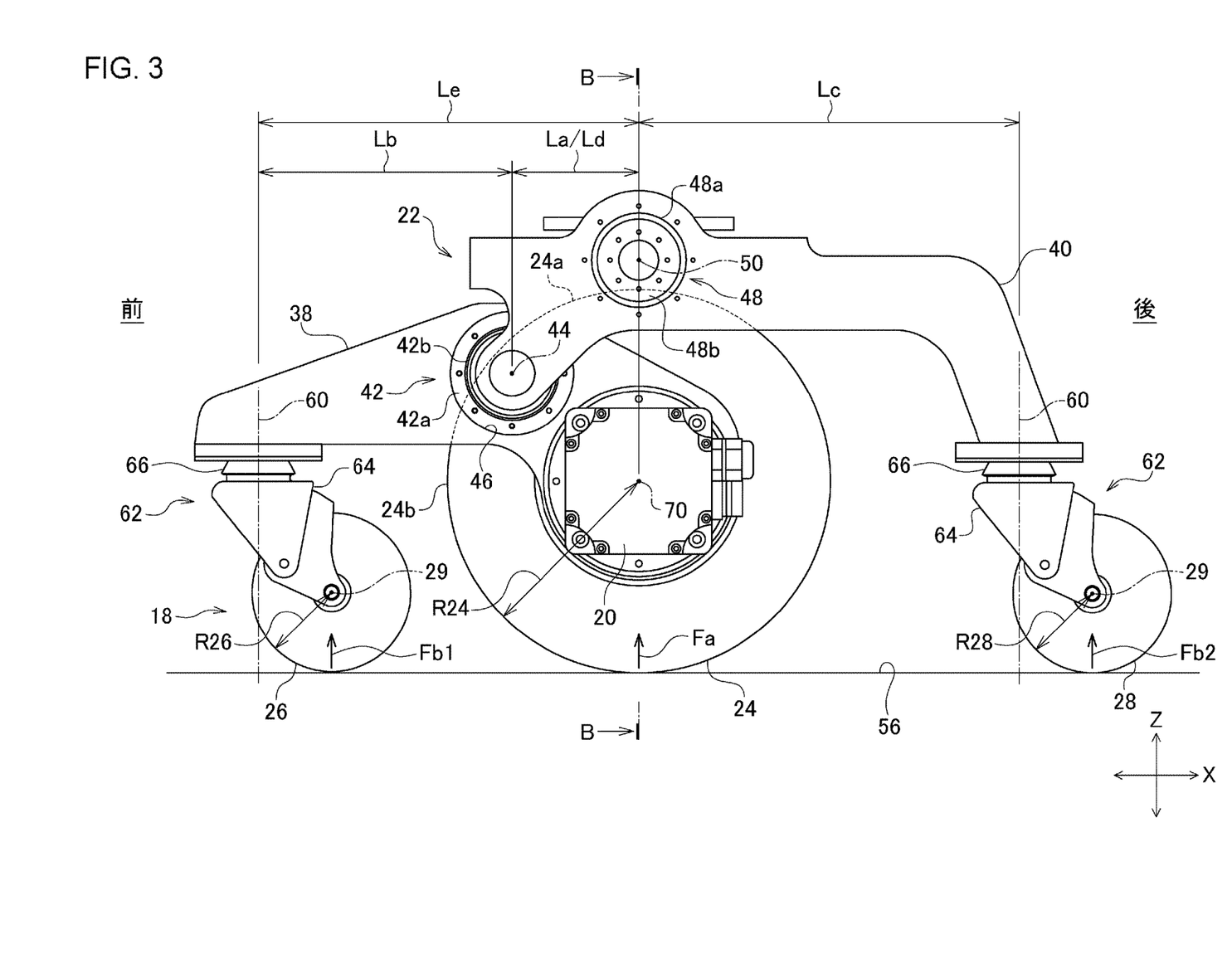
FIG. 3 is a side view of a part of the suspension device of the one embodiment when viewed from the inside in a left-right direction.
Figure 4:
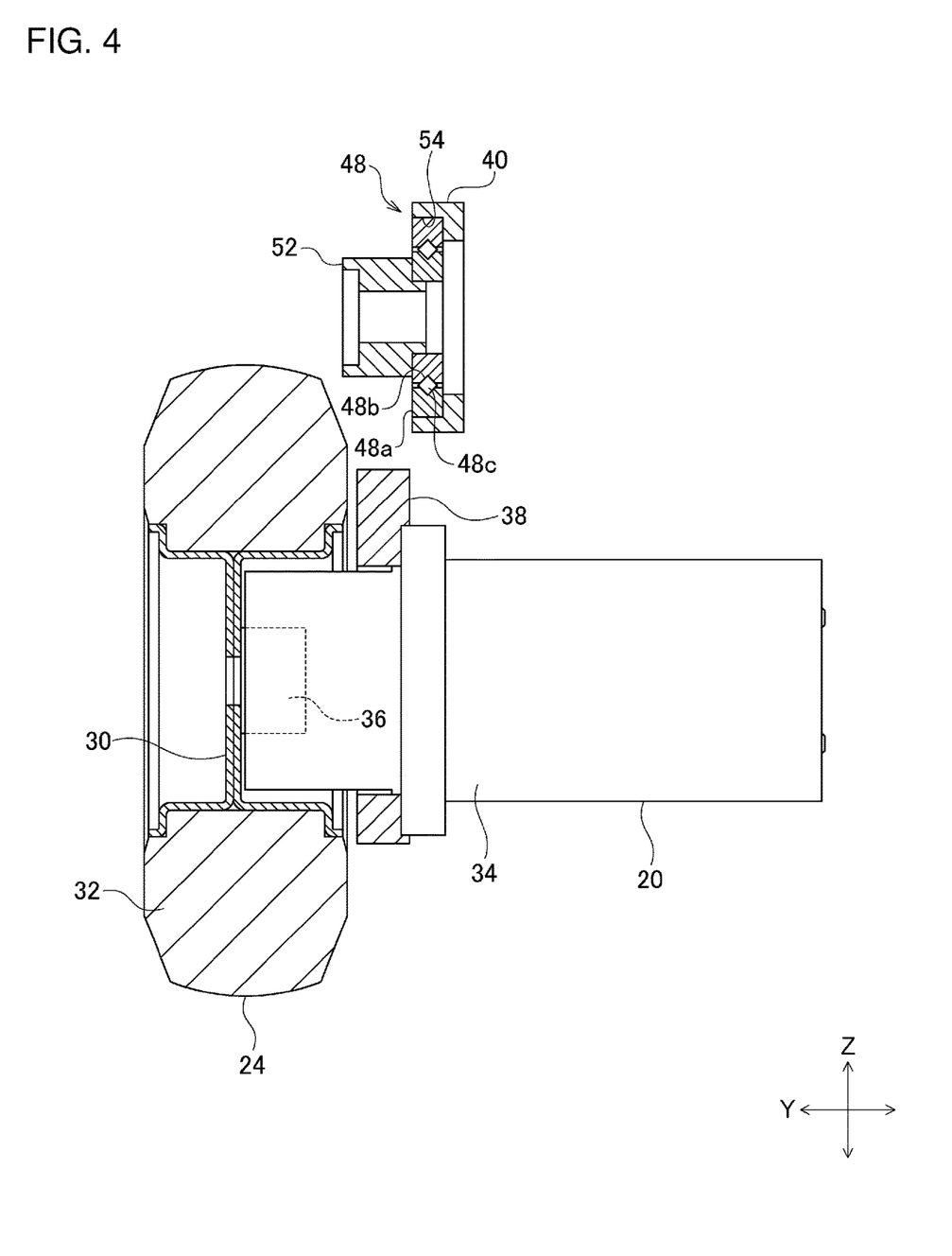
FIG. 4 is a view schematically showing a B-B cross section of FIG. 3.

FIGS. 2, 3, and 4 will be referred to. FIG. 3 is also a view of a part of the suspension device 14 when viewed from an arrow A in FIG. 2. In the present specification, the positional relationship of the respective components will be described using a front-rear direction X, a left-right direction Y, and an up-down direction Z. The front-rear direction X is a horizontal direction perpendicular to a rotation axis 70 (virtual axis) that is the rotation center of a drive wheel 24 (to be described below), and the left-right direction Y is a horizontal direction perpendicular to the front-rear direction X. The up-down direction Z is the vertical direction.

The suspension device 14 includes a pair of wheel sets 18 disposed on both left and right sides, a driving device 20 that drives the drive wheels 24 of the wheel sets 18, and a wheel base (wheel set support body) 22 that supports each of the pair of wheel sets 18).

Each wheel set 18 is composed of a plurality of wheels. The plurality of wheels that constitute the wheel set 18 include a drive wheel 24, a first driven wheel 26 disposed on a front side (a left side in FIG. 3) which is one side in the front-rear direction X with respect to the drive wheel 24, and a second driven wheel 28 disposed on a rear side (a right side in FIG. 3) which is the other side in the front-rear direction X with respect to the drive wheel 24.

The drive wheel 24 is rotatable by power transmitted from the driving device 20. The drive wheel 24 of the present embodiment is a wheel with a tire and includes a wheel 30 rotated by the driving device 20, and a tire 32 attached to the wheel 30. The type of drive wheel 24 is not particularly limited and may be an integrated wheel or the like.

Each driven wheel 26 or 28 is rotatable to follow the rotation of the drive wheel 24 without power being transmitted thereto from the driving device 20. Each driven wheel 26 or 28 of the present embodiment is an integrated wheel. The type of driven wheels 26 and 28 is not particularly limited and may be a wheel with a tire or the like. The first driven wheel 26 of the present embodiment is a front wheel on the front side, and the second driven wheel 28 is a rear wheel on the rear side.

The driving device 20 of the present embodiment is a gear motor. A specific example of the driving device 20 is not particularly limited and may be a motor, an engine, or the like. The driving device 20 includes a casing 34 fixed to a bogie link member 38 (to be described below) with a bolt or the like. The casing 34 penetrates the bogie link member 38 in the left-right direction Y. The driving device 20 is disposed inside the drive wheel 24 in the left-right direction Y. The driving device 20 is fixed to the wheel 30 of the drive wheel 24 with a bolt or the like and includes an output member 36 capable of outputting rotational power. The drive wheel 24 is rotated by power being directly transmitted from the output member 36.

The pair of wheel bases 22 is disposed at a distance in the left-right direction Y. Each wheel base 22 includes a bogie link member 38 that supports the drive wheel 24 and the first driven wheel 26 and a rocker link member 40 that supports the second driven wheel 28 and the bogie link member 38. Each link member 38 or 40 of the wheel base 22 is made of metal such as stainless steel or aluminum.

The bogie link member 38 is an elongated member that is long in the front-rear direction X. The bogie link member 38 is connected to the first driven wheel 26 at one end portion (front end portion) in the front-rear direction X and is connected to the drive wheel 24 at the other end portion (rear end portion) on the opposite side in the front-rear direction X. The bogie link member 38 is connected to the drive wheel 24 via the driving device 20 as mentioned above.

The bogie link member 38 is oscillatably connected to the rocker link member 40 via a first support bearing 42 with relative rotation around a first oscillation axis 44. The first oscillation axis 44 is a virtual axis serving as an oscillation center of the bogie link member 38. The oscillation herein means that a link member (here, the bogie link member 38) pivots around the oscillation axis when viewed from the left-right direction Y, with the mentioned oscillation axis being the oscillation center.

The first support bearing 42 is, for example, a cross roller bearing. The first support bearing 42 includes a first outer ring 42a, a first inner ring 42b, and a plurality of first rolling elements (not shown) that roll on the first outer ring 42a and the first inner ring 42b. The bogie link member 38 has a first accommodating recessed portion 46 that is provided at a spot facing the rocker link member 40 in the left-right direction Y at an intermediate portion in the front-rear direction X and is recessed in the left-right direction Y. The first support bearing 42 is accommodated in the first accommodating recessed portion 46. The first outer ring 42a of the first support bearing 42 is fixed to the bogie link member 38 by screws or the like, and the first inner ring 42b is fixed to the rocker link member 40 by screws or the like. Accordingly, the first support bearing 42 oscillatably connects the bogie link member 38 to the rocker link member 40. A first oscillation axis 44 serving as the oscillation center is provided on an axial center of the first support bearing 42.

The rocker link member 40 is an elongated member that is long in the front-rear direction X. The rocker link member 40 is connected to the bogie link member 38 at one end portion (front end portion) in the front-rear direction X and is connected to the second driven wheel 28 at the other end portion (rear end portion) on the opposite side in the front-rear direction X.

The rocker link member 40 is oscillatably connected to the device body 12 via a second support bearing 48 with relative rotation around a second oscillation axis 50. The rocker link member 40 of the present embodiment is connected to the device body 12 via an attachment member 52 for attachment to the device body 12 in addition to the second support bearing 48. The second oscillation axis 50 is a virtual axis serving as an oscillation center of the rocker link member 40.

The second support bearing 48 is, for example, a cross roller bearing. The second support bearing 48 includes a second outer ring 48a, a second inner ring 48b, and a plurality of second rolling elements 48c that roll on the second outer ring 48a and the second inner ring 48b. The rocker link member 40 has a second accommodating recessed portion 54 that is provided at a spot facing the attachment member 52 in the left-right direction Y at an intermediate portion in the front-rear direction X and is recessed in the left-right direction Y. The second support bearing 48 is accommodated in the second accommodating recessed portion 54. The second outer ring 48a of the second support bearing 48 is fixed to the rocker link member 40 by screws or the like, and the second inner ring 48b is fixed to the attachment member 52 by screws or the like. Accordingly, the second support bearing 48 oscillatably connects the rocker link member 40 to the device body 12 via the attachment member 52. The second oscillation axis 50 serving as the oscillation center is provided on the axial center of the second support bearing 48.

The bogie link member 38 and the rocker link member 40 of the wheel base 22 constitute a rocker bogie mechanism. The rocker bogie mechanism can oscillate each link member 38 or 40 around each oscillation axis 44 or 50 to follow the shape of a traveling surface 56 when traveling on uneven ground with unevenness, undulations, or the like, thereby maintaining a state in which the three wheels (the drive wheel 24 and the driven wheels 26 and 28) are grounded on the traveling surface 56. Accordingly, a situation in which any one of the three wheels is lifted from the traveling surface 56 can be prevented, and high stability can be obtained during traveling on the uneven ground. Since the principle of operation of the rocker bogie mechanism itself is well known, a detailed description thereof will be omitted herein.

The suspension device 14 includes a pivoting support mechanism 62 that supports the driven wheels 26 and 28 to be pivotable around a pivot axis 60 that extends up and down (in the vertical direction). The pivot axis 60 is a virtual axis serving as the pivot center of the driven wheels 26 or 28 and is a vertical axis in the present embodiment. The suspension device 14 of the present embodiment includes individual pivoting support mechanisms 62 corresponding to the first driven wheel 26 and the second driven wheel 28, respectively. In the present embodiment, since the pivoting support mechanism 62 corresponding to the first driven wheel 26 and the pivoting support mechanism 62 corresponding to the second driven wheel 28 have the same configuration, the former configuration will be mainly described, and the description of the latter will be omitted.

The pivoting support mechanism 62 connects the driven wheel 26 or 28 to the wheel base 22 to be pivotable around the pivot axis 60. The first driven wheel 26 is connected to the bogie link member 38 of the wheel base 22 by the pivoting support mechanism 62. The second driven wheel 28 is connected to the rocker link member 40 of the wheel base 22 by the pivoting support mechanism 62. In the present embodiment, the pivoting support mechanism 62 and the driven wheel 26 or 28 function as a turning caster. The pivoting support mechanism 62 includes a wheel support body 64 that supports the driven wheel 26 so as to be rotatable around the axial center of the driven wheel 26 or 28 and a rotation connection mechanism 66 that rotatably connects the wheel support body 64 to the wheel base 22. The wheel support body 64 is configured using, for example, a fork or the like. The rotation connection mechanism 66 of the present embodiment is configured by a rotary joint (swivel joint). An axial center 29 of each driven wheel 26 or 28 is disposed at a position shifted from the pivot axis 60. Accordingly, an intersection point of the pivot axis 60 with respect to the traveling surface 56 and a grounding point of the driven wheel 26 or 28 are shifted to secure a caster rail. Thus, during the traveling of the traveling device 10, the traveling direction of the traveling device 10 and the directions of the driven wheel 26 or 28 can be easily aligned with each other, and excellent straight traveling stability can be obtained.

FIG. 3 will be referred to. A positional relationship between respective components as viewed from the left-right direction Y will be described below. A front-rear dimension from the rotation axis 70, which is the rotation center of the drive wheel 24, to the first oscillation axis 44 is defined as La. A front-rear dimension from the first oscillation axis 44 to a connection position (the pivot axis 60 of the first driven wheel 26 in the present embodiment) of the first driven wheel 26 to the bogie link member 38 is defined as Lb. A front-rear dimension from a connection position (the pivot axis 60 of the second driven wheel 28 in the present embodiment) of the second driven wheel 28 to the rocker link member 40 to the second oscillation axis 50 is defined as Lc. A front-rear dimension from the second oscillation axis 50 to the first oscillation axis 44 is defined as Ld. A front-rear dimension from the second oscillation axis 50 to a connection position of the first driven wheel 26 to the bogie link member 38 is defined as Le. Although La=Ld is established in the present embodiment, these dimensions may be different from each other. The front-rear dimensions herein refer to dimensions in the front-rear direction X.

Upward vertical reaction forces acting on the wheels 24, 26, and 28 from the traveling surface 56 are defined as Fa, Fb1, and Fb2, respectively. Fa is a vertical reaction force of the drive wheel 24, Fb1 is a vertical reaction force of the first driven wheel 26, and Fb2 is a vertical reaction force of the second driven wheel 28. In a case where the rocker bogie mechanism is used, it is known that the ratios (hereinafter referred to as reaction force ratio) of the respective vertical reaction forces Fa, Fb1, and Fb2 can be controlled depending on the ratios of La:Lb and Lc:Ld (hereinafter referred to as length ratios).

In a case where moments around the first oscillation axis 44 resulting from the vertical reaction forces Fa and Fb1 acting on the bogie link member 38 are balanced with each other, Fa×La=Fb1×Lb is established, which is rewritten as La:Lb=Fb1:Fa (A). Additionally, in a case where moments around the second oscillation axis 50 resulting from the vertical reaction forces Fa, Fb1, and Fb2 acting on the rocker link member 40 are balanced with each other, Fb2×Lc=(Fa+Fb1)×Ld is established, which can be rewritten as Lc:Ld=(Fa+Fb1):Fb2 (B). Using the length ratio of the above-mentioned La and the like and the formulas (A) and (B), the reaction force ratio of the vertical reaction forces of the respective wheels 24, 26, and 28 can be obtained.

For example, in the present embodiment, La:Lb is 1:2, and Fb1:Fa is 1:2. Additionally, in the present embodiment, Lc:Ld (=La) is 3:1 (as a result, Lc:Le=1:1), and Fa+Fb1:Fb2 is 3:1. Combining these with each other, the reaction force ratio can be obtained as Fa:Fb1:Fb2=2:1:1.

In the present embodiment, this reaction force ratio means that when the rocker bogie mechanism is in a balanced state, the vertical reaction force Fb1 and Fb2 acting on the driven wheels 26 and 28 are smaller than the vertical reaction force Fa acting on the drive wheel 24. This means that when the driven wheels 26 and 28 in the traveling direction are about to ride on a step on the traveling surface 56, compared to a case where the vertical reaction force Fa and the vertical reaction forces Fb1 and Fb2 are the same, the link members 38 and 40 can easily oscillate such that the driven wheels 26 and 28 rise. Consequently, the driven wheels 26 and 28 easily ride on the step on the traveling surface 56. In addition to this, by making the vertical reaction forces Fb1 and Fb2 smaller than the vertical reaction force Fa, the drive wheel 24 to which power is transmitted from the driving device 20 can lighten the rising motion of the driven wheels 26 and 28 that follows the shape of the traveling surface 56 while enhancing the traction performance. Consequently, it is possible to enhance the traveling performance on the uneven ground. The uneven ground herein includes slippery spots in addition to spots with unevenness, step, or the like.

In this way, in a case where the rocker bogie mechanism is used, La and the like are set to a predetermined length ratio in design such that a vertical reaction force acts on each wheel 24, 26, or 28 in a targeted reaction force ratio.

Here, the first oscillation axis 44 is not on the same vertical line as the rotation axis 70. This means that the first oscillation axis 44 is at a position shifted in the front-rear direction X with respect to the rotation axis 70. The first oscillation axis 44 of the present embodiment is located closer to the first driven wheel 26 side than the rotation axis 70. This is a condition required for realizing the above-mentioned length ratio regarding La:Lb.

A large load is applied to the first support bearing 42 when riding over the step on the traveling surface, and an increase in the size of the first support bearing 42 is required in order to resist the large load. In a case where the first oscillation axis 44 is disposed below the rotation axis 70 in the vertical direction (the up-down direction Z), the first oscillation axis 44 and the first support bearing 42 are too close to the traveling surface 56, and the dimensions of the first support bearing 42 are restricted. In order to prevent this, the first oscillation axis 44 is located above the rotation axis 70 in the vertical direction (up-down direction Z). Accordingly, the dimension of the first support bearing 42 is less likely to be restricted by the traveling surface 56, and the dimension of the first support bearing 42 can be increased. Consequently, it is possible to easily secure the durability required for the first support bearing 42 in order to resist the large load applied when riding over the step.

The first oscillation axis 44 is located inside the contour of the drive wheel 24. The first oscillation axis 44 is located radially inward of (rotation axis 70 side) the drive wheel 24 from an outer peripheral surface 24a of the drive wheel 24 when viewed in the left-right direction Y. Accordingly, compared to a case where the first oscillation axis 44 is located on the first driven wheel 26 side (a left side of a paper surface of FIG. 3) in the front-rear direction X from an end 24b of the drive wheel 24 on the first driven wheel 26 side, a distance La from the rotation axis 70 to the first oscillation axis 44 can be shortened. The shorter the distance La, the shorter the distance Lb required to maintain the length ratio La:Lb. Additionally, simultaneously with this, by shortening these distances La and Lb, a distance Lc required to maintain the Lc:Ld ratio can also be shortened.

Consequently, the front-rear dimension of the entire suspension device 14 can be reduced while maintaining a predetermined length ratio regarding La and the like. The expression "can maintain the predetermined length ratio regarding La or the like" means that a targeted reaction force ratio can be maintained with respect to how the reaction force acts on each wheel 24, 26, or 28.

The effects of the above suspension device 14 will be described.

(A) The suspension device 14 defines the above-mentioned predetermined positional relationship regarding the drive wheel 24 and the first oscillation axis 44. Thus, in the suspension device 14 using the rocker bogie mechanism, the front-rear dimension of the suspension device 14 can be reduced. To realize this, a predetermined length ratio can be maintained regarding La, or the like, as mentioned above. Additionally, in addition to this, as mentioned above, the durability required of the first support bearing 42 can also be secured when riding over the step.

(B) The suspension device 14 includes the pivoting support mechanism 62 that supports the driven wheels 26 and 28 to be pivotable around the pivot axis 60. Thus, when the suspension device 14 tries to change the traveling direction, the driven wheels 26 and 28 can be pivoted to follow the change, and followability when changing the traveling direction is improved.

The pivoting support mechanism 62 is individually provided corresponding to each of the first driven wheel 26 and the second driven wheel 28. Thus, when the rotation directions of the left and right drive wheels 24 are opposite directions, the vehicle can perform an ultra-pivotal turn.

In addition, the first support bearing 42 that connects the bogie link member 38 and the rocker link member 40 to each other is at a position shifted to the first driven wheel 26 side in the front-rear direction X with respect to the rotation axis 70. Thus, a structure is given in which a part of the rocker link member 40 and a part of the bogie link member 38 vertically overlap each other up and down between the first support bearing 42 and the rotation axis 70. For this reason, compared to a case where the first support bearing 42 is on the same vertical line as the rotation axis 70, the front-rear dimension of the entire suspension device 14 can be reduced.

Next, another feature of the suspension device 14 of the present embodiment will be described. In the present embodiment, an outer diameter ratio between the drive wheel 24 and one of the first driven wheel 26 and the second driven wheel 28 is 2:1 or more. In the present embodiment, this condition is satisfied between the drive wheel 24 and the first driven wheel 26 as well as between the drive wheel 24 and the second driven wheel 28. The outer diameter herein means the outer diameter in terms of radius. The outer diameter of the drive wheel 24 is defined as R24, the outer diameter of the first driven wheel 26 is defined as R26, and the outer diameter of the second driven wheel 28 is defined as R28. R24:R26 is 2:1 or more, and R24:R28 is 2:1 or more.

As the outer diameters R26 and R28 of the driven wheels 26 and 28 are increased, the front-rear dimension of the entire suspension device 14 is increased in order to maintain a predetermined length ratio regarding La and the like. For example, as the outer diameter R26 of the first driven wheel 26 increases, it is necessary to increase the front-rear dimension of the bogie link member 38 to increase the distance Lb in order to avoid interference with the drive wheel 24. Along with this, it is necessary to increase the distance La in order to maintain the La:Lb ratio, and it is also necessary to increase the distance Lc in order to maintain the Lc:Ld ratio. As a result, the front-rear dimension of the entire suspension device 14 is increased.

Additionally, as the outer diameter R28 of the second driven wheel 28 increases, it is necessary to increase the front-rear dimension of the rocker link member 40 to increase the distance Lc in order to avoid interference with the drive wheel 24. Along with this, it is necessary to increase the distances La (=Ld) and Lb in order to maintain the Lc:Ld ratio and the La:Lb ratio. As a result, the front-rear dimension of the entire suspension device 14 is increased.

In this regard, by satisfying the above-mentioned condition regarding the outer diameter ratio, compared to a case where the condition is not satisfied, it is possible to reduce the front-rear dimension of the entire suspension device 14 while maintaining a predetermined length ratio regarding La and the like. In addition, although the upper limit of the outer diameter ratio between a driven wheel and the drive wheel 24 is not particularly limited, the upper limit may be, for example, 3 to 4:1 or less.

Another Embodiment

Figure 5:
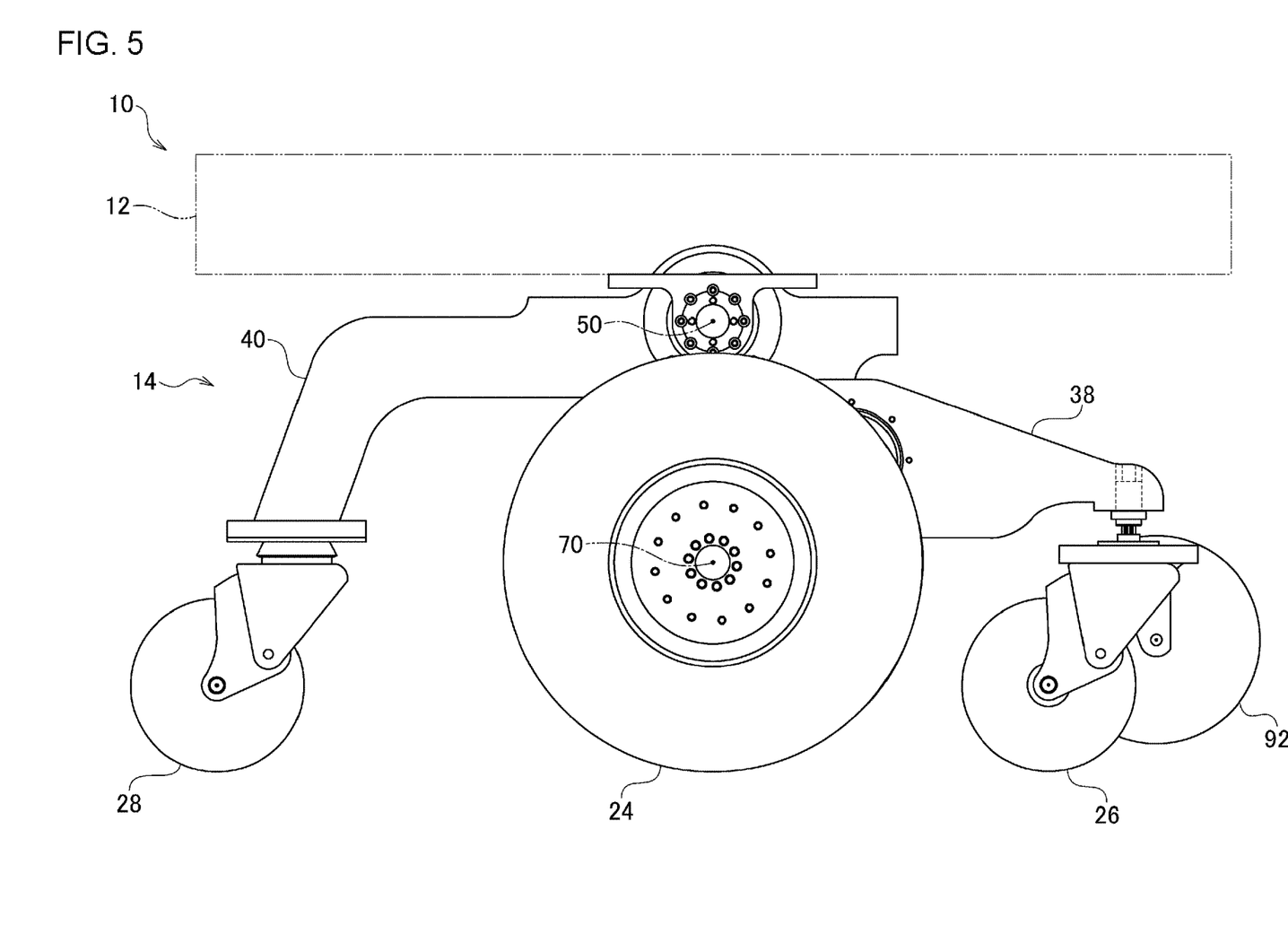
FIG. 5 is a side view of a traveling device according to another embodiment.
Figure 6:
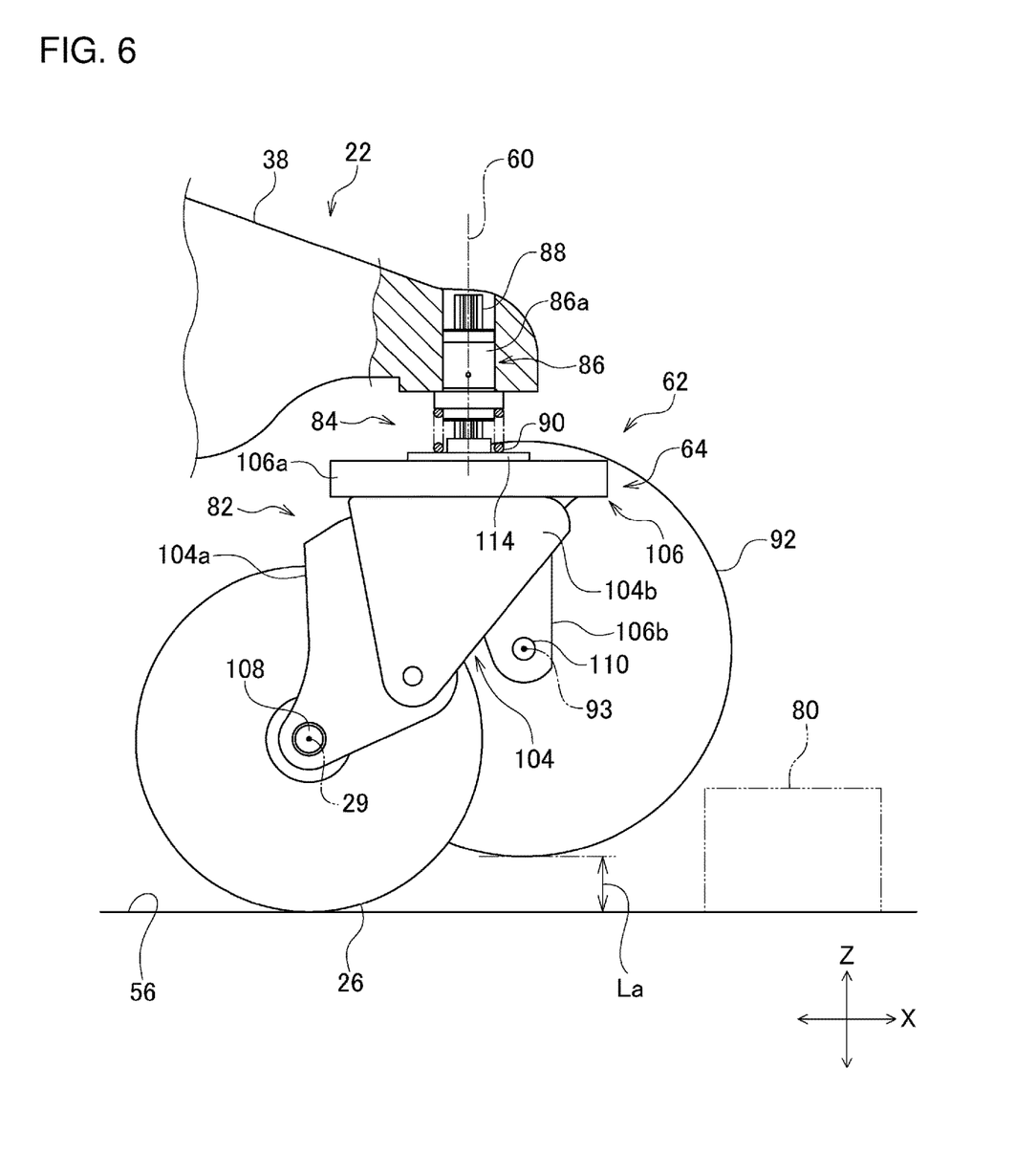
FIG. 6 is a partial cross-sectional side view showing a part of FIG. 5.

FIGS. 5 and 6 will be referred to. The traveling device 10 of the present embodiment is different from that of the one embodiment mainly in a configuration around the first driven wheel 26. Since the configuration around the second driven wheel 28 is the same as that of the one embodiment, the description thereof will be omitted herein. In a case where there is a driven wheel 26 to which power is not transmitted from the driving device 20 in the rocker bogie mechanism, the driven wheel 26 makes it difficult to ride on the step 80 on the traveling surface 56. In the following, devised points for making it easier to ride on the step 80 will be described.

Figure 7:
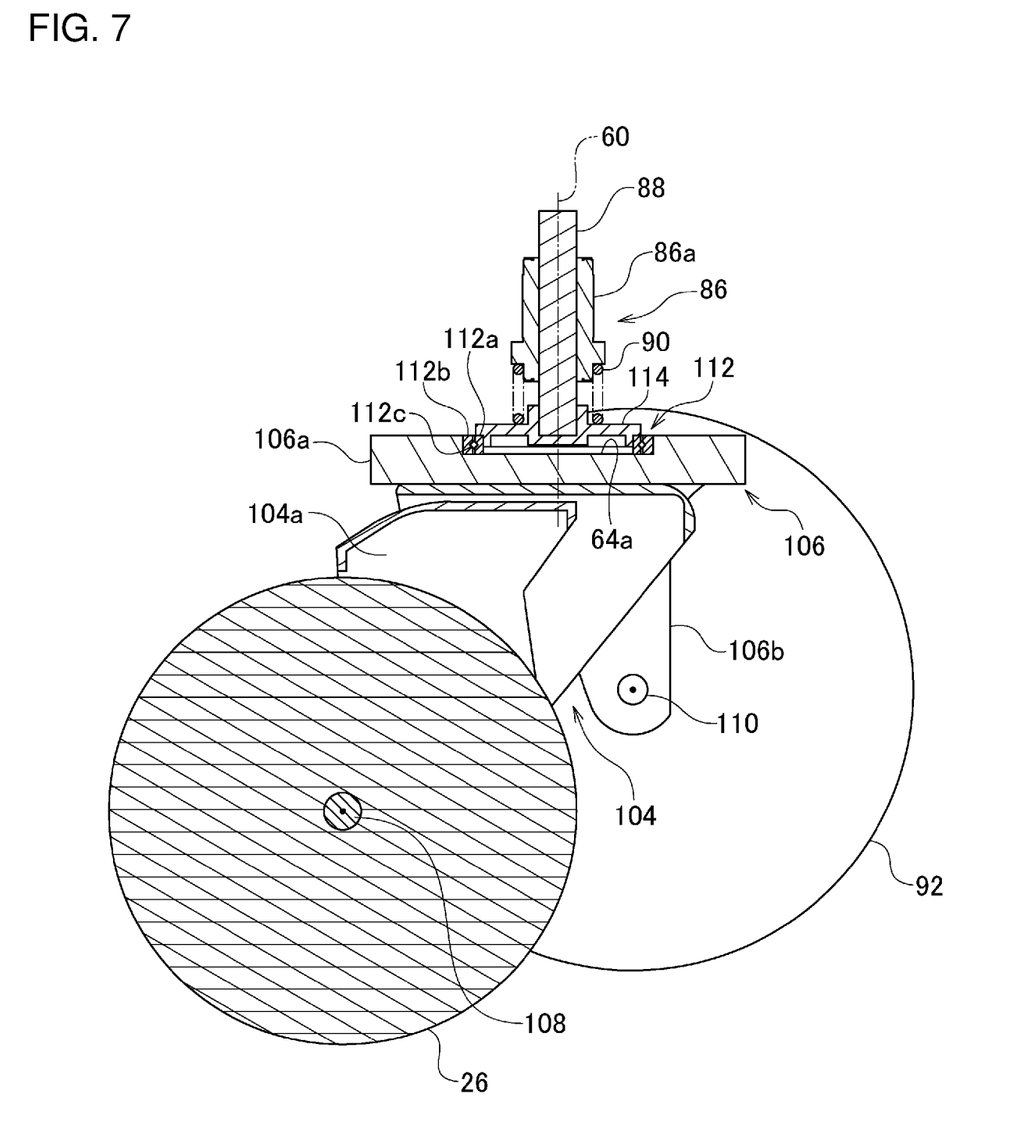
FIG. 7 is a partial cross-sectional side view showing a part of FIG. 5.

FIGS. 6 and 7 will be referred to. The suspension device 14 includes a lifting support mechanism 82 that liftably supports the first driven wheel 26. The lifting support mechanism 82 liftably connects the first driven wheel 26 to the wheel base 22. The lifting support mechanism 82 includes a wheel support body 64 that rotatably supports the first driven wheel 26 around the axial center 29 of the first driven wheel 26, and a lifting connection mechanism 84 that liftably connects the wheel support body 64 to the wheel base 22.

The lifting connection mechanism 84 of the present embodiment includes a linear motion bearing 86 attached to the wheel base 22 (bogie link member 38 in the present embodiment), and a shaft 88 attached to the wheel support body 64. The linear motion bearing 86 supports the shaft 88 linearly movably. The linear motion bearing 86 and the shaft 88 of the present embodiment constitute a ball spline. The shaft 88 constituting the ball spline is a spline shaft including a plurality of splines. The linear motion bearing 86 constituting the ball spline includes an outer cylinder 86a attached to the wheelbase 22, and a plurality of balls (not shown) disposed between the splines of the shaft 88 and the outer cylinder 86a. The linear motion bearing 86 supports the shaft 88 non-rotatably and linearly movably in the axial direction by balls (not shown) rolling on the outer cylinder 86a and the shaft 88. The first driven wheel 26 can be liftably supported with the movement of the wheel support body 64 in the up-down direction Z by the above lifting support mechanism 82.

An impact absorbing member 90 such as a compression spring is disposed between the wheel base 22 and the wheel support body 64. The load of the device body 12 and the wheel base 22 is transmitted to the wheel support body 64 and the first driven wheel 26 via the impact absorbing member 90. When an upward impact load is input to the first driven wheel 26, the impact load is absorbed by elastically deforming the impact absorbing member 90. Consequently, the impact load transmitted to the device body 12 of the traveling device 10 can be alleviated.

The suspension device 14 includes an auxiliary wheel 92 located upward and away from the flat traveling surface 56 in a state in which the first driven wheel 26 is grounded on a flat traveling surface 56. The auxiliary wheel 92 is disposed inside the first driven wheel 26 in the left-right direction Y. The outer diameter of the auxiliary wheel 92 of the present embodiment is larger than the outer diameter of the first driven wheel 26. The auxiliary wheel 92 is rotatably supported around an axial center 93 of the auxiliary wheel 92 by the wheel support body 64. The lifting support mechanism 82 integrally and liftably supports the first driven wheel 26 and the auxiliary wheel 92. The auxiliary wheel 92 protrudes to a side (here, to the front side) opposite to the second driven wheel 28 in the front-rear direction X (see also FIG. 5) with respect to the first driven wheel 26.

The pivoting support mechanism 62 corresponding to the first driven wheel 26 integrally supports the first driven wheel 26 and the auxiliary wheel 92 to be pivotable around the pivot axis 60. Apart of the pivoting support mechanism 62 also serves as the configuration of the lifting support mechanism 82. More specifically, the wheel support body 64 and shaft 88 (to be described below) of the pivoting support mechanism 62 also serve as the configuration of the lifting support mechanism 82.

The pivoting support mechanism 62 corresponding to the first driven wheel 26 includes, as described in the one embodiment, the wheel support body 64 that rotatably supports the first driven wheel 26 around the axial center of the first driven wheel 26, and the rotation connection mechanism 66 that pivotably connects the wheel support body 64 to the wheel base 22.

The wheel support body 64 includes a first wheel support member 104 that supports the first driven wheel 26, and a second wheel support member 106 that supports the auxiliary wheel 92.

The first wheel support member 104 includes a first fork 104a that supports the first driven wheel 26, and a second fork 104b that supports the first fork and is supported by the second wheel support member 106. The first driven wheel 26 of the present embodiment is supported by the first fork 140a of the first wheel support member 104 via an axle 108.

The second wheel support member 106 includes a plate-shaped second base portion 106a, and a plate-shaped second support portion 106b extending downward from the second base portion 106a. The first wheel support member 104 is fixed to the second base portion 106a of the second wheel support member 106. The second support portion 106b supports the auxiliary wheel 92 via an axle 110.

The rotation connection mechanism 66 of the present embodiment includes a shaft 88 attached to the wheel base 22, and a rotary bearing 112 disposed between the shaft 88 and the wheel support body 64 to rotatably connect the wheel support body 64 to the shaft 88.

The rotary bearing 112 includes an inner ring 112a, an outer ring 112b, and a plurality of rolling elements 112c that roll on the inner ring 112a and the outer ring 112b. The shaft 88 of the present embodiment is fixed to the inner ring 112a of the rotary bearing 112 via a bearing holder 114 mounted on a lower end portion of the shaft 88. The rotary bearing 112 of the present embodiment is accommodated in a recessed portion 64a provided in an upper surface portion of the wheel support body 64, and an outer ring 112b thereof is fixed to an inner peripheral portion of the recessed portion 64a.

The above pivoting support mechanism 62 pivots the first driven wheel 26 by pivoting the wheel support body 64 around the pivot axis 60 that extends up and down and passes through the axial center of the shaft 88 with respect to the wheel base 22. The above pivoting support mechanism 62 integrally supports the first driven wheel 26 and the auxiliary wheel 92 to be pivotable around the pivot axis 60.

In addition, the shaft 88 of the pivoting support mechanism 62 of the present embodiment also serves as the configuration of the lifting support mechanism 82 and is attached to the wheel base 22 via the linear motion bearing 86 used in the lifting support mechanism 82. The shaft 88 of the pivoting support mechanism 62 may be attached to the wheel base 22 so as to be linearly immovable without using the linear motion bearing 86 in a case where the shaft 88 does not also serve as the configuration of the lifting support mechanism 82. Additionally, the shaft 88 of the lifting support mechanism 82 also serves as the configuration of the pivoting support mechanism 62 and is rotatably attached to the wheel support body 64 via the rotary bearing 112 used in the pivoting support mechanism 62. The shaft 88 of the lifting support mechanism 82 may be non-rotatably attached to the wheel support body 64 in a case where the shaft 88 does not also serve as the configuration of the pivoting support mechanism 62.

Figure 8A:
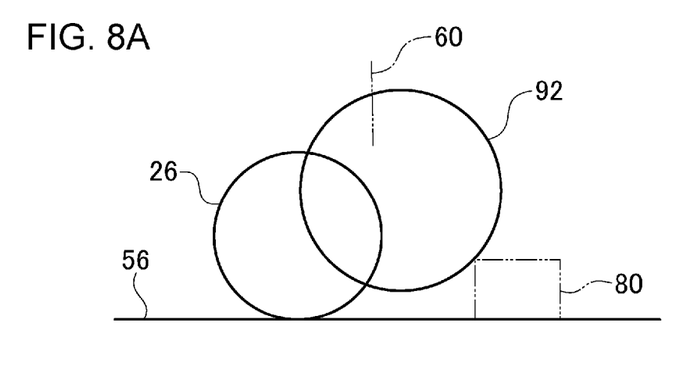
FIG. 8A is a first explanatory diagram regarding the operation of auxiliary wheels.
Figure 8B:
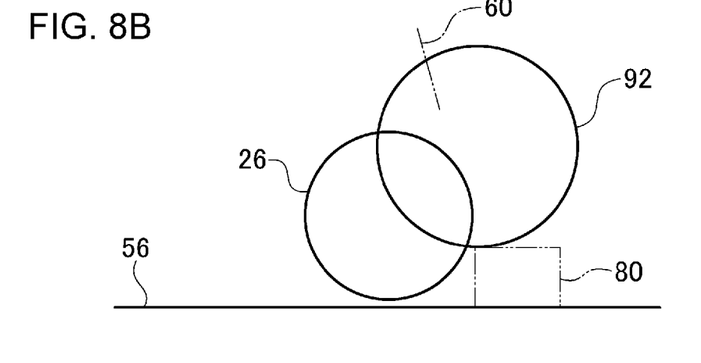
FIG. 8B is a second explanatory diagram thereof.

The operation regarding the above auxiliary wheel 92 will be described. FIG. 8A will be referred to. FIGS. 8A to 8C schematically show only the positions of the first driven wheel 26, the auxiliary wheel 92, and the pivot axis 60. A case where the traveling device 10 travels with the side opposite to the second driven wheel 28 with respect to the first driven wheel 26 (here, the front side and a right side of a paper surface of FIG. 8A) as the traveling direction will be considered. In this case, since the auxiliary wheel 92 protrudes to the side opposite to the second driven wheel 28 in the front-rear direction X, the auxiliary wheel 92 can ride on the step 80 on the traveling surface earlier than the first driven wheel 26 as shown in FIG. 8B. In this case, since the auxiliary wheel 92 is located upward and away from the flat traveling surface 56 as mentioned above, the auxiliary wheel 92 can easily ride on the high step 80 compared to a case where the auxiliary wheel 92 is grounded on the traveling surface 56.

Figure 8C:
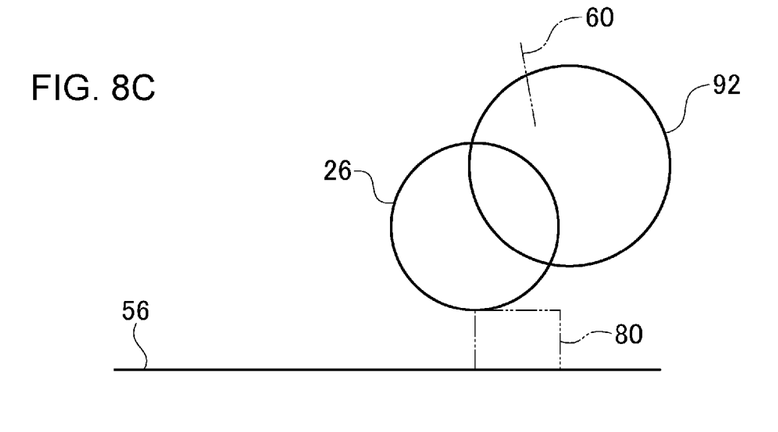
FIG. 8C is a third explanatory diagram thereof.

After the auxiliary wheel 92 rides on the step 80, when the traveling device 10 further travels in the traveling direction, the first driven wheel 26 can ride on the step 80 as shown in FIG. 8C. As a result, the first driven wheel 26 and the auxiliary wheel 92 can easily ride on the step 80 that is higher than the highest step on which the first driven wheel 26 alone rides.

In addition, when the auxiliary wheels 92 ride on the step 80, the link members 38 and 40 of the rocker bogie mechanism oscillate around the oscillation axes 44 and 50 to follow the movement. FIGS. 8A to 8C show that the link members 38 and 40 are oscillating by showing a change in the inclination of the pivot axis 60. Accordingly, while the auxiliary wheel 92 is riding on the step 80, although not shown, the drive wheel 24 and the second driven wheel 28 are in contact with the traveling surface 56, and the auxiliary wheel 92 is in contact with the step 80 on the traveling surface 56 instead of the first driven wheel 26. That is, even when the auxiliary wheel 92 rides on the step 80, a state in which the three wheels (the auxiliary wheel 92, the drive wheel 24, and the second driven wheel 28) is grounded on the traveling surface 56 can be maintained.

The effects of the above suspension device 14 will be described.

(C) The suspension device 14 includes the lifting support mechanism 82 that liftably supports the first driven wheel 26. Thus, the first driven wheel 26 can be lifted and lowered to follow the step 80 of the traveling surface 56, and the highest height of the step 80 on which the first driven wheel 26 can ride can be increased.

(D) The suspension device 14 includes the auxiliary wheel 92 located away from the traveling surface 56. Thus, the combination of the auxiliary wheel 92 and the driven wheel 26 can ride over the step that is higher than the highest step on which the driven wheel 26 can ride. When the size of the driven wheel 26 is increased in order to ride over such a high step, the front-rear dimension of the entire suspension device 14 is increased in order to maintain a predetermined length ratio regarding the above-mentioned La and the like. In this regard, according to the present embodiment, it is unnecessary to increase the size of the driven wheel 26 in order to ride over a high step, and consequently, it is possible to avoid an increase in the front-rear dimension of the entire suspension device 14.

(E) The pivoting support mechanism 62 of the present embodiment integrally and pivotably supports the first driven wheel 26 and the auxiliary wheel 92. Thus, when the suspension device 14 tries to change the traveling direction, the first driven wheel 26 and the auxiliary wheel 92 can be integrally pivoted with the rudder angles (orientations) of the first driven wheel 26 and the auxiliary wheel 92 aligned to follow the change. For this reason, regardless of whether the suspension device 14 is traveling straight or traveling curvedly, the auxiliary wheel 92 can ride on the step with the rudder angles of the first driven wheel 26 and the auxiliary wheel 92 aligned, and a smooth operation can be maintained before and after the auxiliary wheel 92 rides on the step.

(F) The lifting support mechanism 82 of the present embodiment integrally and liftably supports the first driven wheel 26 and the auxiliary wheel 92. Thus, the first driven wheel 26 and the auxiliary wheel 92 can be integrally lifted and lowered to follow the step on the traveling surface 56, and the height by which the first driven wheel 26 and the auxiliary wheel 92 can ride on can be further increased.

Next, modifications of the respective components described so far will be described.

In the embodiment, an example in which the first driven wheel 26 is a front wheel on one side (front side) in the front-rear direction X, and the second driven wheel 28 is a rear wheel on the other side (rear side) in the front-rear direction X will be described. In addition to this, the first driven wheel 26 may be a rear wheel on one side (rear side) in the front-rear direction X, and the second driven wheel 28 may be a front wheel on the other side (front side) in the front-rear direction X.

In the one embodiment, an example has been described in which the length ratios of La and the like are set such that the vertical reaction forces Fb1 and Fb2 are smaller than the vertical reaction force Fa. The relationship between the length ratio and the reaction force ratio is not particularly limited. For example, the length ratio of the La and the like may be set such that the vertical reaction forces Fa, Fb1, and Fb2 acting on the wheels 24, 26, and 28 are uniform. In a case where this is realized, for example, La:Lb in FIG. 3 may be set to 1:1, and Lc (=La):Ld may be set to 1:2.

Additionally, in order to make the vertical reaction forces Fb1 and Fb2 acting on the driven wheels 26 and 28 smaller than the vertical reaction force Fa acting on the drive wheel 24, the length ratio of La and the like is not limited to the content of the embodiment. For example, in order to make the vertical reaction force Fb1 of the first driven wheels 26 smaller than the vertical reaction force Fa of the drive wheels 24, La:Lb may be 1:X (X is a numerical value exceeding 1). Although X has been described as 2 in the embodiment, X may be any numerical value exceeding 1. Accordingly, Fb1:Fa can be set to 1:X from the formula (A), that is, the vertical reaction force Fb1 can be made smaller than the vertical reaction force Fa. In this case, Lc:Ld may be set to 1+X:1 (which results in Lc:Le being 1:1). Accordingly, Fa:Fb1:Fb2 can be X:1:1 from the formulas (A) and (B). That is, both the vertical reaction forces Fb1 and Fb2 can be made smaller than the vertical reaction force Fa. Here, although an example in which both the vertical reaction forces Fb1 and Fb2 are smaller than the vertical reaction force Fa has been described, the length ratio of La and the like may be set such that at least one of the vertical reaction forces Fb1 and Fb2 is smaller than the vertical reaction force Fa.

The pivoting support mechanism 62, the lifting support mechanism 82, and the auxiliary wheel 92 described in the embodiment are not essential, and the suspension device 14 may not include one or more of them or all of them.

The pivoting support mechanism 62 may pivotably support the driven wheels 26 and 28, and specific examples thereof are not particularly limited. Additionally, in relation to the above-mentioned effect (B), the pivoting support mechanism 62 only needs to be provided corresponding to only any one of the first driven wheel 26 and the second driven wheel 28. It can also be said that the suspension device 14 only needs to include the pivoting support mechanism 62 that pivotably supports one of the first driven wheel 26 and the second driven wheel 28.

The wheel support body 64 only needs to be capable of rotatably supporting the driven wheel 26 or 28 around the axial center of the driven wheel 26 or 28, and the specific configuration thereof is not particularly limited.

An example in which the lifting support mechanism 82 liftably supports the first driven wheel 26 has been described. In addition to this, in relation to the above-mentioned effect (C), the lifting support mechanism 82 may liftably support the second driven wheel 28. The lifting support mechanism 82 only needs to liftably support one of the first driven wheel 26 and the second driven wheel 28. In this case, the items described in the embodiment can be embodied by the content in which the first driven wheel 26 is replaced with the second driven wheel 28.

In a case where the linear motion bearing 86 is used for the lifting connection mechanism 84 of the lifting support mechanism 82, a specific example of the linear motion bearing 86 is not particularly limited and may be, for example, a slide bush or the like. In addition to this, the lifting connection mechanism 84 of the lifting support mechanism 82 may be a guide mechanism such as a linear guide, in addition to the combination of the linear motion bearing 86 and the shaft 88.

Although an example in which the wheel support body 64 of the lifting support mechanism 82 supports the auxiliary wheel 92 in addition to the driven wheel 26 has been described, the wheel support body 64 may support only the driven wheel 26 without supporting the auxiliary wheel 92. Also in this case, the above-mentioned effect (C) can be similarly obtained. Additionally, although an example has been described in which the lifting support mechanism 82 integrally and liftably supports the first driven wheel 26 and the auxiliary wheel 92, the lifting support mechanism 82 may integrally and liftably support the second driven wheel 28 and the auxiliary wheel 92.

In the one embodiment, an example has been described in which in order to obtain the above-mentioned effect (D), the auxiliary wheel 92 is provided corresponding to the first driven wheel 26 and protrudes to the side opposite to the second driven wheel 28 with respect to the first driven wheel 26. In order to obtain the same effect, the auxiliary wheel 92 may be provided corresponding to the second driven wheel 28 and protrude to the side opposite to the first driven wheel 26 with respect to the second driven wheel 28. The auxiliary wheel 92 only needs to protrude, with respect to one of the first driven wheel 26 and the second driven wheel 28, to the side opposite to the other driven wheel in the front-rear direction X. In this case, when the traveling device 10 travels with the side opposite to the first driven wheel 26 with respect to the second driven wheel 28 as the traveling direction, the same effect as the above-mentioned (D) can be obtained. In addition to this, the auxiliary wheels 92 may be individually provided corresponding to the first driven wheels 26 and the second driven wheels 28, respectively.

The outer diameter ratio of the drive wheel 24 to one of the first driven wheel 26 and the second driven wheel 28 may be less than 2:1. Additionally, only the outer diameter ratio between the drive wheel 24 and one of the driven wheels may be 2:1 or more, and the outer diameter ratio between the drive wheel 24 and the other driven wheel may be less than 2:1.

The above embodiment and modifications are exemplary. The technical ideas in which these are abstracted should not be interpreted as being limited to the contents of the embodiments and modifications. Many design changes such as changes, additions, and deletions of components are possible for the contents of the embodiment and modifications. In the above-mentioned embodiment, the contents that allow such design changes are emphasized with the notation "embodiment". However, the design changes are allowed even in the contents with no such notation. The hatching given to the cross section of the drawing does not limit the material of a hatched object. Structures/numerical values referred to in the embodiment and modifications naturally include those that can be regarded as the same when manufacturing errors and the like are taken into consideration.

It should be understood that the invention is not limited to the above-described embodiment, but may be modified into various forms on the basis of the spirit of the invention. Additionally, the modifications are included in the scope of the invention.

What is claimed is:

1. A suspension device comprising:
a drive wheel;
a first driven wheel that is disposed on one side in a front-rear direction with respect to the drive wheel;
a second driven wheel that is disposed on another side in the front-rear direction with respect to the drive wheel;
a bogie link member that supports the drive wheel and the first driven wheel and is oscillatable around a first oscillation axis; and
a rocker link member that supports the second driven wheel and the bogie link member and is oscillatable around a second oscillation axis,
wherein when viewed from a left-right direction, the first oscillation axis is not on a same vertical line as a rotation axis of the drive wheel and is located above the rotation axis in a vertical direction and located inside a contour of the drive wheel.

2. The suspension device according to claim 1, further comprising:
a pivoting support mechanism that supports one of the first driven wheel and the second driven wheel to be pivotable around a pivot axis that extends up and down.

3. The suspension device according to claim 1, further comprising:
a lifting support mechanism that liftably supports one of the first driven wheel and the second driven wheel.

4. The suspension device according to claim 1, further comprising:
an auxiliary wheel that is located away from a traveling surface in a state in which one of the first driven wheel and the second driven wheel is grounded on the traveling surface,
wherein the auxiliary wheel protrudes to a side opposite to the other of the first driven wheel and the second driven wheel in the front-rear direction with respect to the one driven wheel.

5. The suspension device according to claim 4, further comprising:
a pivoting support mechanism that supports the one driven wheel and the auxiliary wheel to be pivotable around a pivot axis that integrally extends up and down.

6. The suspension device according to claim 4, further comprising:
a lifting support mechanism that integrally and liftably supports the one driven wheel and the auxiliary wheel.

7. The suspension device according to claim 1,
wherein an outer diameter ratio between the drive wheel and one of the first driven wheel and the second driven wheel is 2:1 or more.

8. A traveling device comprising:
a suspension device;
a device body attached to the suspension device;
the suspension device comprising:
a drive wheel;
a first driven wheel that is disposed on one side in a front-rear direction with respect to the drive wheel;
a second driven wheel that is disposed on another side in the front-rear direction with respect to the drive wheel;
a bogie link member that supports the drive wheel and the first driven wheel and is oscillatable around a first oscillation axis; and
a rocker link member that supports the second driven wheel and the bogie link member and is oscillatable around a second oscillation axis,
wherein when viewed from a left-right direction, the first oscillation axis is not on a same vertical line as a rotation axis of the drive wheel and is located above the rotation axis in a vertical direction and located inside a contour of the drive wheel.

* * * * *